July 9, 1940.　　　R. W. JOHNSON ET AL　　　2,207,123
INTERCHANGEABLE CONTROL VALVE
Filed Sept. 20, 1937　　　3 Sheets-Sheet 1
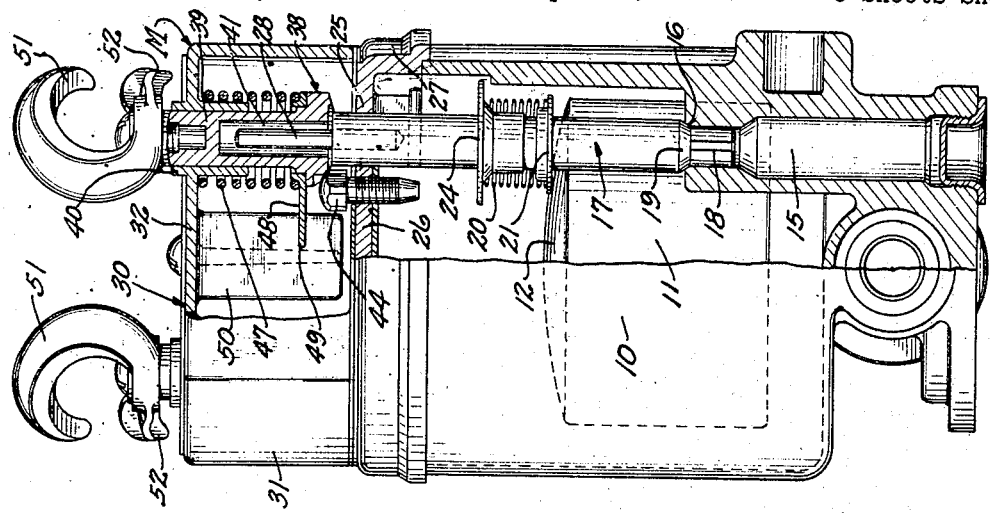
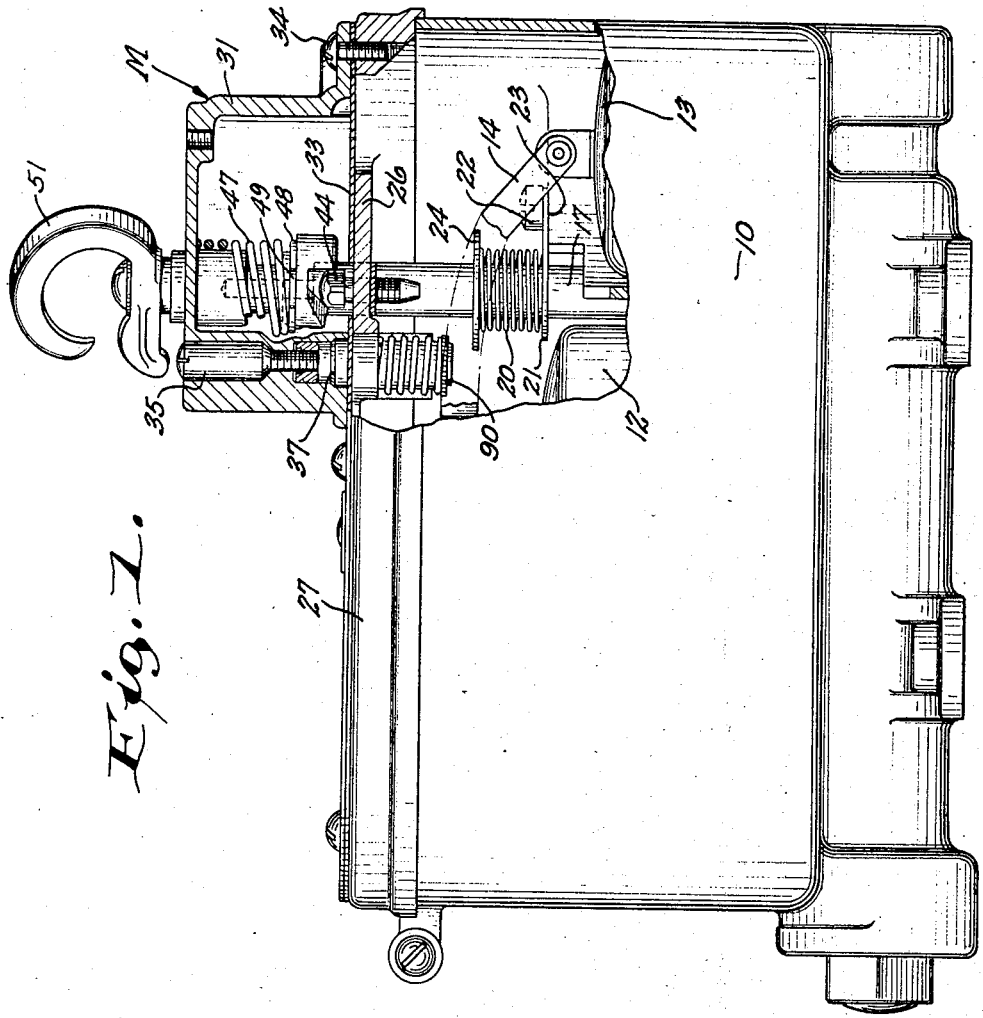
INVENTORS
Roy W. Johnson and Herbert M. Reeves
BY
John W. Michael ATTORNEY.

July 9, 1940.  R. W. JOHNSON ET AL  2,207,123
INTERCHANGEABLE CONTROL VALVE
Filed Sept. 20, 1937   3 Sheets-Sheet 2
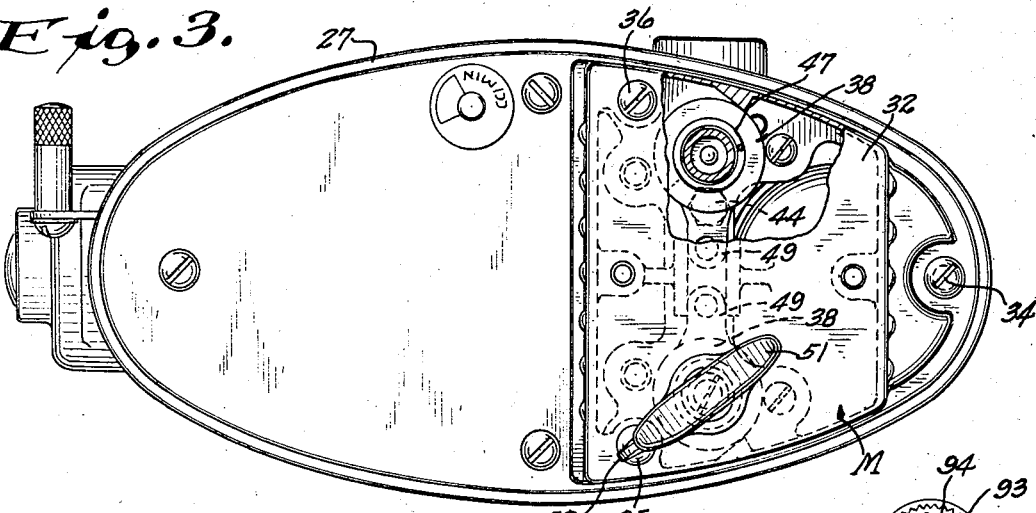
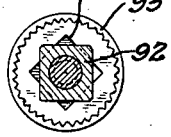
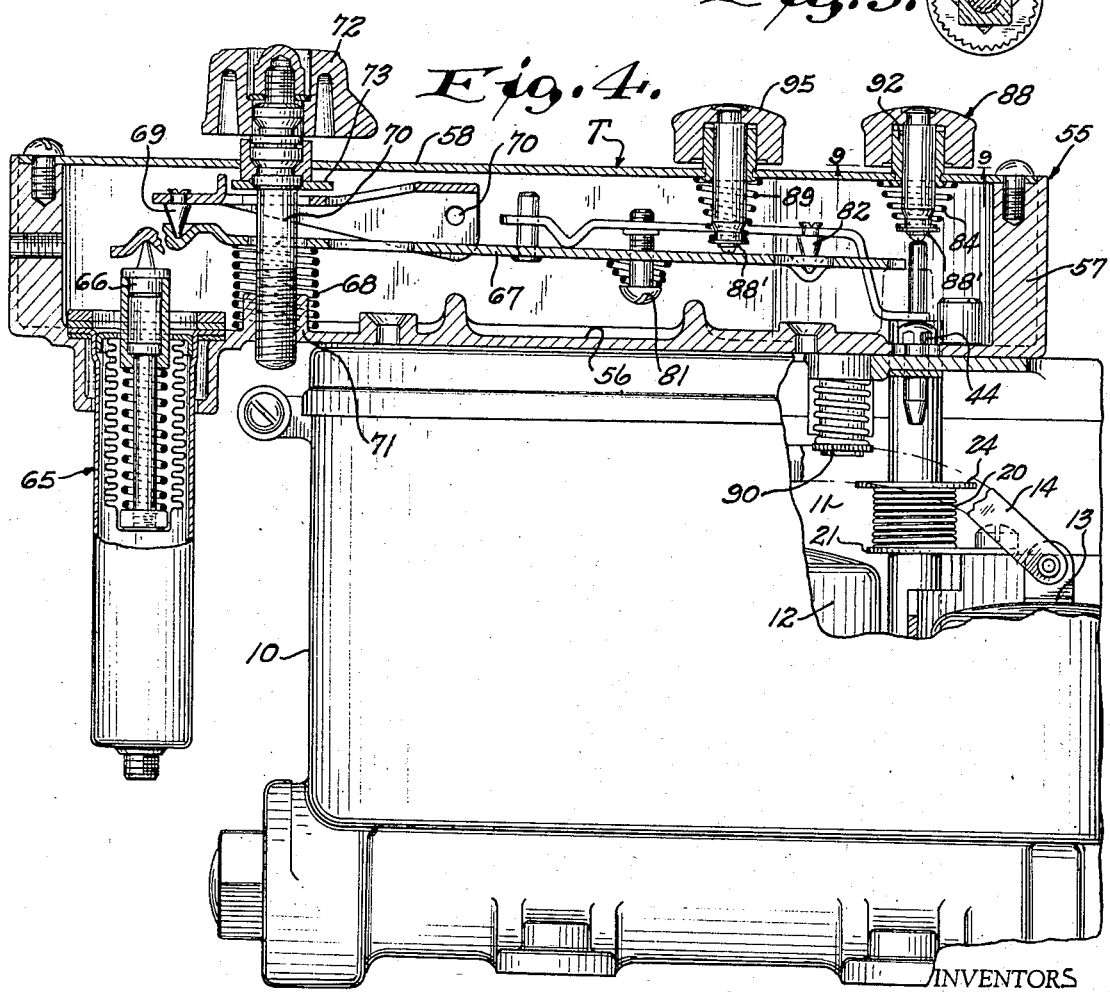
INVENTORS
Roy W. Johnson and
Herbert M. Reeves
BY John W. Michael ATTORNEY.

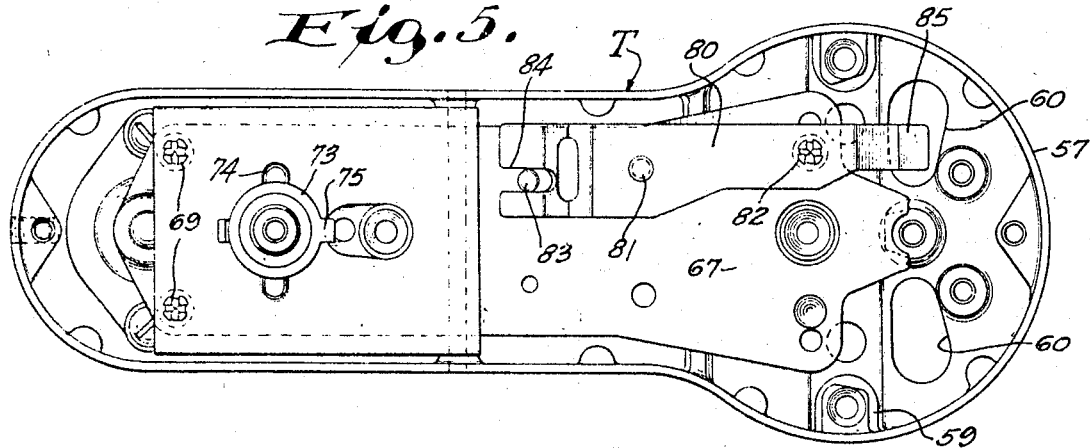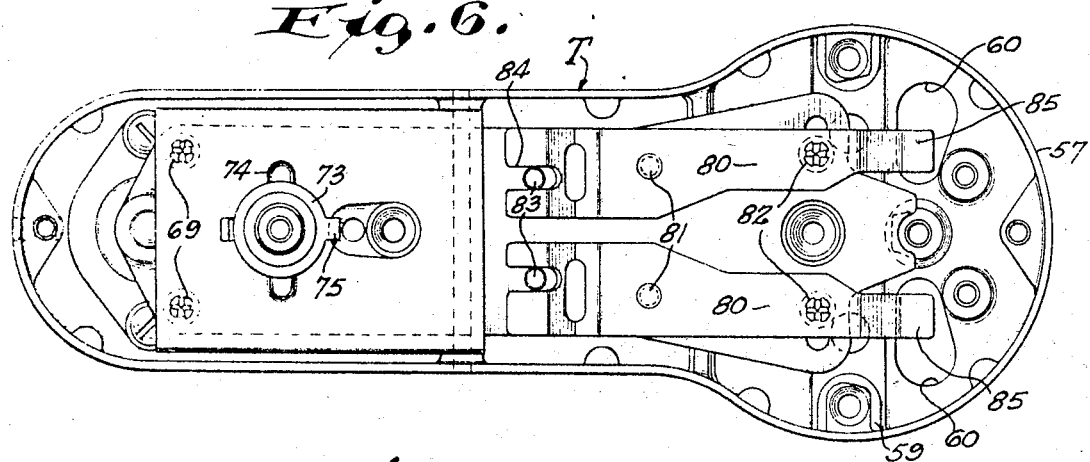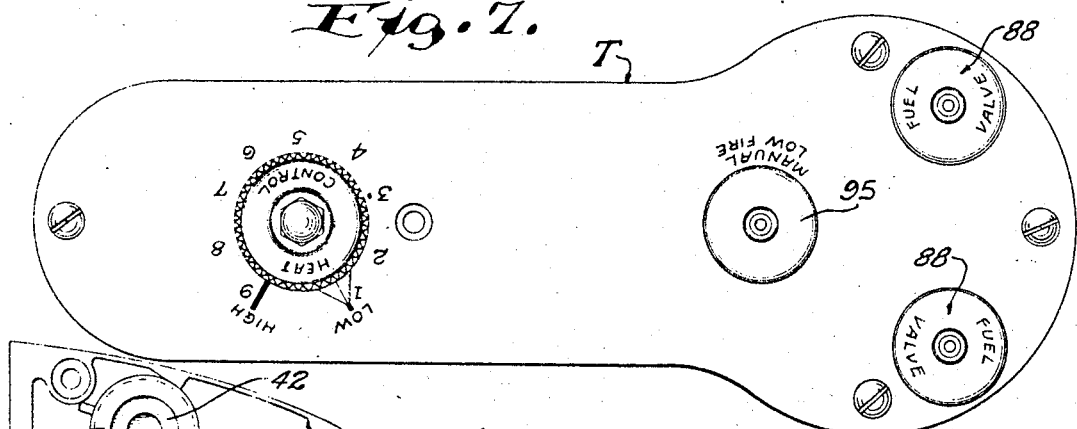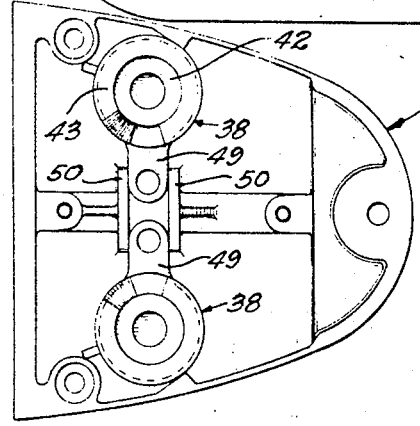

Patented July 9, 1940

2,207,123

UNITED STATES PATENT OFFICE 2,207,123

INTERCHANGEABLE CONTROL VALVE

Roy W. Johnson, Milwaukee, Wis., and Herbert M. Reeves, Kankakee, Ill., assignors to Automatic Products Company, Milwaukee, Wis., a corporation of Wisconsin Application September 20, 1937, Serial No. 164,792

10 Claims. (Cl. 137—21)

This invention relates generally to an improvement in control devices of the type incorporated in the fuel line between a reservoir and a burner where the liquid fuel is fed by gravity to the burner.

Devices of this character usually consist of a casing having a liquid supply chamber provided with a fuel inlet which is connected up to the reservoir. A float controlled valve regulates the flow through the inlet to maintain a constant level in the chamber. The outlet from the chamber is connected to the burner and in many cases flow through the outlet is regulated by a metering valve. Heretofore the metering valve has been either manually or thermostatically controlled but in prior devices the construction has been such that when the device is constituted for or equipped with one type of control it is practically impossible to adapt it for or equip it with the other type of control.

One of the principal objects of the invention is to provide a control unit of this character which is so constructed and organized that it may be readily converted from a manually controlled metering valve type to a thermostatically controlled metering valve type and yet the conversion from one type to the other does not disturb the adjustment of the device or its capacity to maintain the desired low and high fire adjustments.

Another object of the invention is to provide an oil control device of this character and having these advantages and which is so constituted that the conversion of the unit from a manual to a thermostatically controlled type or vice versa may be accomplished simply by removing and resetting three screws or similar fastening devices.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in longitudinal vertical section showing a control device embodying the present invention;

Figure 2 is a view of the control unit shown in Figure 1 and illustrating the device partly in end elevation and partly in transverse vertical section;

Figure 3 is a top plan view of the device shown in Figures 1 and 2;

Figure 4 is a view similar to Figure 1 but illustrating the control device converted to the thermostatically operated type;

Figure 5 is a top plan view of the thermostatic control unit, the top or cover plate of the control unit being removed;

Figure 6 is a view similar to Figure 5 but showing the thermostatic control unit equipped to operate two metering valves;

Figure 7 is a top plan view of the thermostatic control unit with the top or cover plate in place;

Figure 8 is a bottom plan view of the manual control unit; and

Figure 9 is a detail view in section taken on line 9—9 of Figure 4.

Referring to the drawings it will be seen that the control device comprises a casing designated generally at 10 and having a main liquid supply chamber 11 therein. Liquid is supplied to the chamber through a float valve controlled inlet (not shown). Insofar as the float valve controlled inlet and associated mechanism is concerned the device is of the type and structure shown in Johnson Patent 2,068,138 granted January 19, 1937, and reference is made to said patent for a full disclosure of these features. In the drawings of the present case the numeral 12 designates the main float of the constant level device and the numeral 13 the auxiliary float and the numeral 14 a portion of a latching lever of the safety cutoff mechanism, all of which are fully described and shown in the Johnson patent referred to.

The liquid flows out from the chamber 11 through one or more outlets 15 which are connected up to the burner (not shown). In the construction shown two outlets are provided and they may be selectively or simultaneously employed. As the outlets and their associated mechanisms are identical, a description of one will serve for both.

Each outlet 15 is provided with a valve seat 16. A tubular metering valve 17 regulates flow through each outlet 15 and for this purpose its lower end is reduced and slotted as at 18 and is provided with a beveled portion 19 adapted to engage the seat 16 and shut off flow through the outlet. As the metering valve 17 is moved upwardly flow through the outlet increases and conversely when the valve is moved downwardly the flow through the outlet decreases.

A coil spring 20 encircles an intermediate portion of each valve 17 and its lower end engages with an apertured abutment plate 21 secured by means of screw 22 to a ledge 23 formed on the inner wall of the casing 10. The valve 17 slides freely through the opening of the abutment plate 21. The upper end of the spring 20 engages a flange or collar 24 which is fixed to the valve. The spring 20 is under compression and tends to bias the valve 17 to open position. The upper end portion of the valve is solid and cylindrical and slides through an opening or guide 25 provided therefor in a flat cross piece 26 which is integral with the cover 27 of the casing 10. A stem 28 projects upwardly beyond the upper end of each valve 17 to adapt the valve to co-act with a shut off plunger as will hereinafter more clearly appear.

The position of the metering valve may be adjusted and controlled by means of a manual control unit designated generally at M and illustrated in Figures 1, 2, 3 and 8, or by means of a thermo control unit designated generally at T and illustrated in Figures 4 to 7 inclusive.

The manual control unit M comprises a casing designated generally at 30 and provided with a peripheral wall 31, a closed top 32 and an open bottom. When assembled with the control device the casing of the manually operable unit rests on a removable plate 33 of the cover 27 and is held in position by three screws designated at 34, 35 and 36, the screw 34 being engaged in a threaded opening in the margin of the cover 27 and the screws 35 and 36 being engaged internally to threaded studs 37 fixed to and projecting upwardly from the cross piece 26 of the cover 27.

The manual control unit includes a manually operable cam 38 for each outlet or metering valve. As illustrated, each cam 38 may be formed on the lower end of a short shaft 39 rotatably mounted in a bearing 40 integrally formed with the top 32 of the casing 30. Each cam and its shaft are provided with a central opening 41 to accommodate the stem 28 of its valve. The lower end of each cam 38 is formed with a flat and plain central abutting surface 42 which bears on the upper end of its valve 17. The active face 43 of each cam extends around its periphery and bears on the rounded head of an adjustable stop screw 44 which is threaded into the cross piece 26 and set to maintain the low fire adjustment.

A spring 47 surrounds each shaft 39 and its bearing 40 and abuts the underside of the top 32 of the casing 30 at its upper end and a washer 48 at its lower end. The washer 48 seats against a shoulder presented at the juncture of the cam and its shaft and has a radially extending finger 49 which works between guide lugs 50 depending from the top of the casing so as to render the action of the device smoother and noiseless.

The spring 47 is stronger than the spring 20 and consequently the spring 47 tends to move the cam 38 and consequently the metering valve 17 downward. The extent to which the spring can exert this action is controlled by the stop screw 29 and the angular portion of the active cam face 43 relative to this screw. The upper end of each shaft 39 projects through the top of the casing and has a finger piece 51 secured thereto and equipped with a pointer 52 designed to travel over a suitable dial (not shown) on the top of the casing 30.

With a structure of this kind and the manual controlled unit M in place the high fire adjustment is determined by the pitch of the cam. The low fire adjustment is determined by the stop screw 44 which limits the extent to which the spring 47 can force the cam 38 and valve 17 downwardly.

By removing the screws 34, 35 and 36 the manual control unit may be readily removed and the thermo control unit T substituted therefor. As shown to advantage in Figures 4 to 7 inclusive the thermo control unit comprises a flat elongated casing designated generally at 55 and made up of a bottom wall 56, a peripheral wall 57 and a removable top plate or wall 58. The bottom wall 56 is designed to rest flatly on the top of the cover 27. Integral with the bottom wall of the thermo control unit are downwardly opening sockets 59 which in the assembly with the control devices fit over the studs 37. The top walls of these sockets 59 are apertured. This construction makes it practical to use the same screws 35 and 36 which held the manual control unit in place to secure the thermo control unit in position, the top plate 58 of the thermostatic control unit having openings overlying the sockets to facilitate access to the screws.

When the thermo control unit is in position to stop screws 44 and the upper ends of the metering valves 17 project up through oblong openings 60 provided in the bottom wall of the thermo control unit.

One end of the casing of the thermo control unit overhangs the casing 10 of the control device. A thermo responsive element or bulb 65 depends from the overhung portion of the thermo control unit and has its movable element 66 engaging one end of the main operating lever 67. A spring 68 urges the lever 67 up against its adjustable fulcrum 69. The fulcrum 69 is in the form of a lever pivotally mounted as at 70 in the casing of the thermo controlled unit. The fulcrum is adjusted by swinging the lever about its pivotal mounting and this may be accomplished by means of a screw 70 threadedly interconnected with an internally threaded bearing 71 integral with bottom wall 56. The upper end of the screw projects up through the top of the casing and is provided with a knob 72 whereby it may be turned. A disc 73 fixed to the screw bears on bosses 74 pressed up from the body of the lever so that as the screw moves up and down the disc correspondingly swings the lever. The disc 73 may be provided with a stop lug 75 engageable with a cooperable stop lug 76 struck up from the lever.

Individual valve operators 80 are mounted on the lever, there being of course, one such operator for each valve. These valve operators are adjustable relative to the main lever 67 by means of screws 81 which rock the valve operating elements about their points 82 which bear down on the levers. Angular shifting of the valve operators is prevented by means of pins 83 secured to and up setting from the cam lever and engaged in slots 84 of the valve operating element. Each valve operator has its forward portion bent downward as at 85, and is positioned to overlap or overlie a portion of the upper end of its metering valve and also the adjacent adjusting or stop screw 44. With this arrangement the adjusting screws 44 limit the motion of the valve operators in one direction and thereby maintain the low fire adjustment.

When the thermo control unit T is employed, the high fire adjustment is controlled by means of an adjustable abutment 90 depending from the member 26 of the cover and lying in the path of upward movement of the collar 24. This abutment 90 is adjusted in the factory so that no adjustment of it is necessary when converting the device from a manually controlled to a thermostatically controlled type of unit.

A knob controlled shutoff plunger designated generally at 88 overlies each metering valve. When the plungers are in the lowermost positions their lower ends bear on the stems 28 and force the metering valves down to fully closed position. The plungers are urged downwardly by means of coil spring 89 interposed between the underside of the cover or top plate 58 and 88' secured to the lower end of each plunger. Each plunger is slidable through a bearing 92 which externally is non-circular. The underside of each knob 93 is provided with an opening corresponding to the external contour of the bearing 92. This construction permits the knobs to be pulled upwardly and rotated relative to their bearings whereupon the opening 95 and bearings will be out of register and the knob will be held elevated. A similarly constructed knob designated at 95 is provided and when in the low position moves the main lever 67 down and hence causes both metering valves to be moved to their low fire adjustment.

With a device of this character a manual controlled unit or a thermo controlled may be interchangeably employed merely by removing and replacing three screws. And yet the low fire adjustment is not disturbed and the high fire adjustment is maintained in either event.

A structure of this kind makes it entirely practical to ship the device with the standard manual control and yet the thermostatically controlled unit may be added at any time if the user so desires.

While we have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The invention claimed is:

1. An oil control device of the character described comprising a main casing having a fuel supply chamber provided with an outlet, a cover for said casing having an opening in the portion thereof which overlies said outlet, a metering valve cooperable with the outlet for regulating flow therethrough and having a valve stem projecting through said opening and above the cover of said casing, means for biasing the metering valve to open position, a low fire stop disposed above the cover of the casing adjacent the upper end of the metering valve stem, and a control unit comprising a separate casing adapted to be supported on the top of said main casing, means for detachably securing said control casing to said main casing, and a valve operator supported on said control casing and overlying and engageable with a portion of the upper end of the valve stem and a portion of said stop.

2. A control device of the character described comprising a main casing having a fuel supply chamber provided with an outlet, a cover for the main casing having an opening in the portion thereof overlying the outlet, a metering valve cooperable with the outlet to regulate flow therethrough and having a valve stem projecting through said opening and above said cover, means for biasing the metering valve to open position, a control unit comprising a separate casing adapted to be supported on the cover, releasable means for fastening the control casing in position on the cover, a low fire stop adjustably supported on the cover adjacent the upper end of the metering valve stem, a valve operator disposed in the control casing and having a portion overlying and engageable with the metering valve stem and the low fire stop to control the position of the metering valve, and means mounted on said control casing for shifting said valve operator whereby to regulate the position of said metering valve.

3. A control device of the character described comprising a main casing having a fuel supply chamber provided with an outlet having a valve seat, a cover for said main casing having a portion overlying the outlet, a metering valve cooperable with the valve seat of said outlet and having its upper portion of its stem projecting above the cover, means for biasing the metering valve to open position, a low fire stop screw threadedly connected with the cover adjacent the upper end of the metering valve stem, a control unit comprising a casing having a closed side and a closed top and open at its bottom, means for detachably securing the control casing to the cover, in enclosing relation to the upper end of said valve stem and stop screw, and a manually operable cam rotatably supported on the top of the control casing and having an active cam face riding on the stop screw and also having a portion engageable with the upper end of the metering valve stem, and spring means for pressing the cam against its stop screw whereby upon rotative adjustment of the cam the metering valve will be shifted relative to its seat.

4. An oil control device of the character described comprising a main casing having a fuel supply chamber provided with an outlet, a cover for the main casing having a portion overlying the outlet and provided with an opening, a metering valve cooperable with the outlet and having the upper portion of its valve stem extending through the opening in the cover and projecting thereabove, a stop screw threaded to the cover and having its upper end projecting above the same and disposed adjacent the upper end of the metering valve stem, means for biasing the metering valve to open position, and a control unit for the metering valve comprising a separate casing adapted to be supported on and detachably secured to said cover in enclosing relation to the upper end of the metering valve stem and the stop screw, a valve operator shiftably supported in the control casing and having a portion overlapping and engageable with portions of the metering valve stem and the stop screw, and means for moving said portion of the valve operator downwardly to shift the metering valve toward closed position against the action of its biasing means.

5. An oil control device of the character described comprising a main casing having a fuel supply chamber provided with an outlet, a cover for the main casing having a portion overlying the outlet and provided with an opening, a metering valve cooperable with the outlet and having the upper portion of its valve stem extending through the opening in the cover and projecting thereabove, a stop screw supported on the cover and having its upper end projecting above the same and disposed adjacent the upper end of the metering valve stem, means for biasing the metering valve to open position, and a control unit for the metering valve comprising a control casing having closed top and sides and an open bottom, means for detachably securing the control casing to said cover with the control casing in enclosing relation to the upper end of the metering valve and stop screw, a cam supported on the control casing for rotation and for axial shifting movement, said cam having an active face riding on the stop screw and having a portion engageable with the upper end of the metering valve stem, a spring interposed between the cam and the top of the control casing and pressing it against the stop screw, and means disposed exteriorly of the control casing and connected to the cam to provide for rotation thereof and consequent adjustment of the metering valve.

6. An oil control device of the character described comprising a main casing having a fluid supply chamber provided with an outlet, a cover for said casing having an opening in the portion thereof which overlies the outlet, a metering valve cooperable with the outlet for regulating flow therethrough and having a valve stem projecting through said opening and above the cover of the casing, means for biasing the metering valve to open position, a low fire stop disposed above the cover of the casing adjacent the upper end of the metering valve stem, and a control unit comprising a separate casing adapted to be supported on the top of said main casing, means for detachably securing said control casing to said main casing, a cam supported on the control casing for rotating movement and cooperable with the low fire stop and the metering valve, and means disposed exteriorly of the control casing and connected to the cam for adjusting the same.

7. A control device of the character described comprising a casing having a fuel supply chamber provided with an outlet, a metering valve regulating flow through the outlet, spring means for biasing the metering valve to open position, a low fire adjustment screw disposed adjacent the valve, a control unit detachably secured to the top of the casing and having a valve operator engaged with the upper end of the valve and overlying the stop screw to be limited in its action thereby, and a manually operable spring loaded plunger adjustable to close said valve.

8. A control device of the character described comprising a casing having a fuel supply chamber provided with an outlet, a metering valve regulating flow through the outlet, spring means for biasing the metering valve to open position, a low fire abutment disposed adjacent the metering valve, a control unit detachably secured to the casing and having a valve operator cooperable with the valve and engageable with the low fire abutment to limit its action in closing the valve, and manually operable means to effect closure of said valve.

9. A control device of the character described comprising a casing having a fuel supply chamber provided with a plurality of outlets, a metering valve regulating flow through each of said outlets, spring means for biasing said metering valves to open position, an adjustable low fire abutment adjacent each metering valve, a thermo control unit detachably secured to the casing and having a thermostatically controlled main operating lever, an individual operator for each valve connected to and actuated by said lever, and cooperable with their respective valves and associated with low fire abutments, and manually operable means cooperable with the lever for simultaneously shifting all of the valves to low fire position.

10. A control device of the character described comprising a casing having a fuel supply chamber provided with a plurality of outlets, a metering valve regulating flow through each of said outlets, spring means for biasing said metering valves to open position, an adjustable low fire abutment adjacent each metering valve, a thermo control unit detachably secured to the casing and having a thermostatically controlled main operating lever, an individual operator for each valve connected to and actuated by said lever, and cooperable with their respective valves and associated low fire abutments, and manually operable means cooperable with the lever for simultaneously shifting all of the valves to low fire position, in combination with means for selectively and manually closing said valves.

ROY W. JOHNSON.
HERBERT M. REEVES.